United States Patent [19]
Zalkin

[11] 3,807,134
[45] Apr. 30, 1974

[54] IMPACT ROLLER FOR AUTOMATIC DECAPPING MACHINE

[75] Inventor: Michel Zalkin, Puteaux, France

[73] Assignee: Fowler Products, Inc., Athens, Ga.

[22] Filed: Feb. 2, 1973

[21] Appl. No.: 329,064

[52] U.S. Cl.................. 53/381 A, 53/331.5, 81/3.2
[51] Int. Cl............................................ B65b 43/40
[58] Field of Search ........... 53/381 A, 331.5; 81/3.2

[56] References Cited
UNITED STATES PATENTS
3,686,824   8/1972   Rink et al. ........................ 53/381 A
3,623,292   11/1971   Barnes .............................. 53/331.5

*Primary Examiner*—Travis S. McGehee
*Attorney, Agent, or Firm*—Eric P. Schellin; Martin P. Hoffman

[57] ABSTRACT

High-speed, automatic machine for removing metal caps from glass bottles as the bottles are continuously advanced through the machine on a conveyor belt, said machine being characterized by an impact roller for striking the caps prior to removing same by a series of relatively rotatable rollers. The impact roller is mounted on an eccentric shaft secured to a deck spaced above the upper end of the bottles, and a pneumatic cylinder is connected by an extensible piston to the roller to oscillate same in a vertical plane. The oscillation of the impact roller delivers a sharp blow to the metal cap, and breaks any temporary seal formed between the interior of the cap and the neck of the bottle. Adjustment means are provided so that the machine may be utilized effectively with bottles of various dimensions, and the speed of operation can also be varied.

7 Claims, 7 Drawing Figures

IMPACT ROLLER FOR AUTOMATIC DECAPPING MACHINE

BACKGROUND OF THE INVENTION

1. Field of the Invention

This invention relates to a machine for removing metal caps from glass bottles, such as those used in the sale of soft drinks, beer and wine, wherein the bottles are sealed by a cap having a thin metal skirt that is deformed against the neck of the bottle.

2. Description of the Prior Art

The instant invention provides a high speed, automated machine for continuously removing caps from returnable bottles used in breweries, wineries, and other bottling plants, where large quantities of bottles are prepared for filling. Many of the returnable bottles are returned with the caps fitted back onto the bottles; this is particularly applicable where deformable and resealable thin metal caps are utilized. The bottles must have the caps removed so that the bottles can be cleaned and subsequently refilled.

Frequently, the caps are difficult to remove because a temporary seal or bond is formed between the interior of the cap and the bottle. Such bond is due to the drying of the carbohydrates in the fluid contained in the bottle after some of said fluid has been spilled on the surfaces defined between the cap and the bottle. The drying of the carbohydrates forms a natural adhesive which resists the removal of the cap. Currently, the caps are removed either manually or semi-automatically by a combination of manual and automatic operations. In the former instance, a worker may strike the cap sharply to break the seal frequently formed between the cap and the bottle, then spin the cap off the bottle with his fingers and throw the cap into a collection receptacle. In the latter instance, the worker may strike the cap sharply to break the seal and then place the bottle, with its loosened cap, on a conveyor belt which advances the bottle through a decapping machine. The decapping machine utilizes a series of relatively rotatable rollers to spin the cap upwardly off the neck of the bottle, and an air jet blows the freed cap into a chute which leads to a collection receptacle. An exemplary semi-automatic cap removing machine is disclosed in U.S. Pat. No. 2,650,748 granted to E. C. Bennett and Charles Powell.

The difficulty of removing the thin metal caps from resealable bottles is compounded by the unique configuration of the resealable cap itself, which is markedly dissimilar from the heavy duty rigid metal and cork crown previously used for beer and soft drinks prior to the advent of the resealable metal cap. A representative resealable cap is disclosed in U.S. Pat. No. 3,303,955 assigned to Aluminum Corporation of America. Such cap is fabricated from exceedingly thin aluminum with a horizontally extending upper surface and a relatively long depending skirt. After filling the bottle, the cap is slipped over the open upper end thereof, and then an automated sealing head with a vertically movable pressure block forces the cap flat against the upper end of the bottle to drive the air out from under the cap. Then, rotatable discs secured to the sealing head are engaged with the outer surface of the skirt of the cap. The discs deform the skirt, or roll a thread into the skirt, as they travel vertically along the neck of the bottle. Threads on the neck of the bottle usually serve as an anvil and cooperate with the discs in forming or rolling the threads. Manifestly, conventional decapping machines adapted to remove the rigid and short-skirted crown-type cap by a prying action are ill-suited for removing the thin aluminum resealable caps. An illustrative decapper for crown-type caps is shown in U.S. Pat. No. 3,237,289 granted to Reinhold A. Pearson and William D. Rigg.

SUMMARY

Consequently, with the defects of the prior art techniques and machines clearly in mind, the instant invention contemplates a fully automatic decapping machine that is adapted to remove resealable caps from bottles at high rates of speed. Such machine, which employs an impact roller to strike the cap before spinning same off the bottle by a series of relatively rotatable rollers, is simple in structure and economical in operation. The value of the aluminum recovered from the resealable caps far exceeds the costs of operating the machine, and the capacity of the machine (up to 20,000 bottles per hour) further enhances its commercial appeal. Furthermore, the machine is versatile and can handle bottles and/or caps of various dimensions and diverse configuration without damaging the bottles or caps so that the bottles may be recycled for refilling and the caps may be reclaimed.

Other desirable objectives will become apparent from the ensuing description when construed in harmony with the accompanying drawings, which depict a preferred mode of carrying forth the instant invention.

DESCRIPTION OF THE PREFERRED EMBODIMENT

Figure 1:
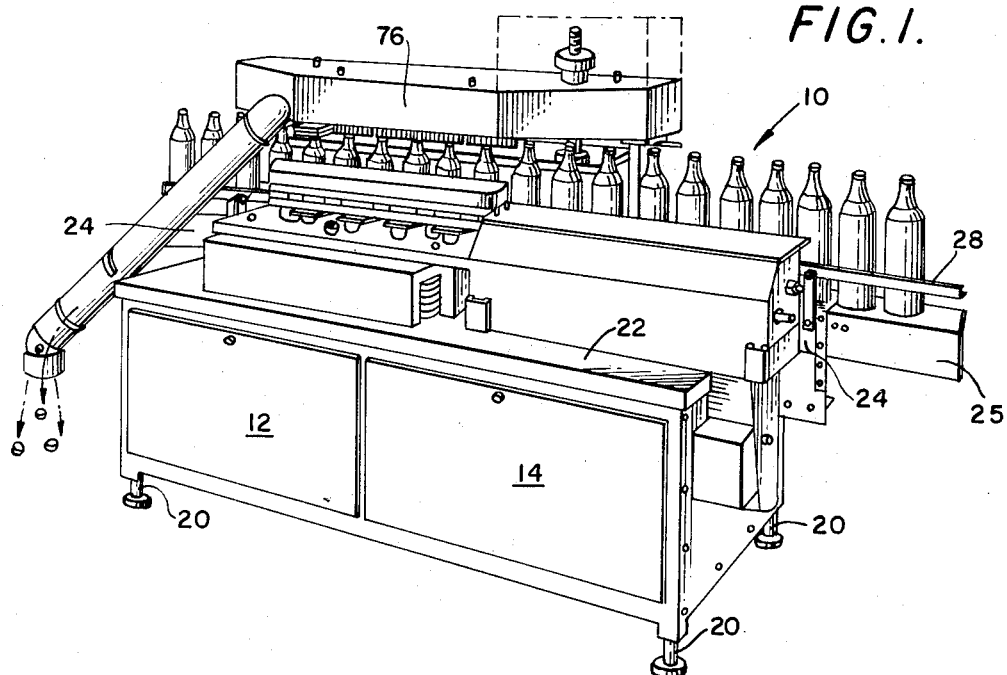
FIG. 1 is a perspective view of an automatic decapping machine constructed in accordance with the principles of the instant invention.
Figure 2:
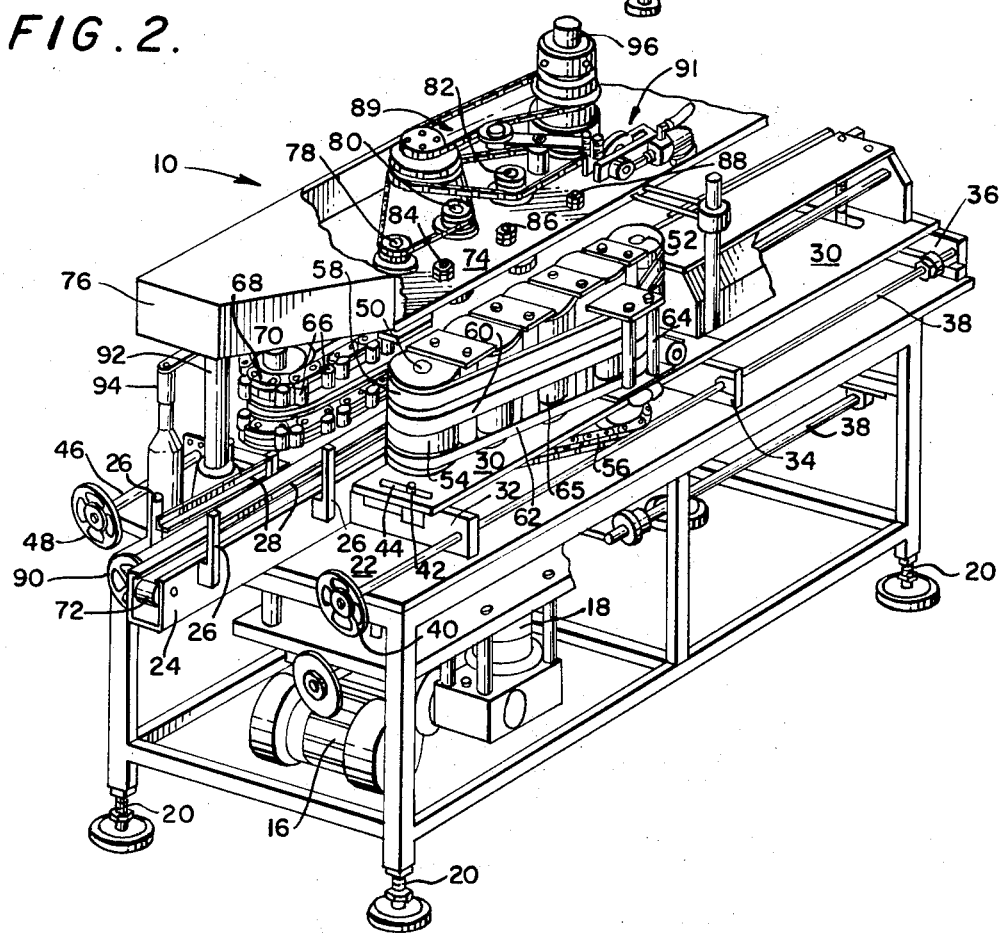
FIG. 2 is another perspective view of the decapping machine taken from another sighting point, with portions broken away for the sake of clarity.

Referring now to the drawings wherein identical reference numerals identify identical components, FIGS. 1 and 2 show a decapping machine indicated generally by reference numeral 10. FIG. 1 is taken from a sighting position at the right front corner of machine 10, while FIG. 2 is taken from a sighting position at the left front corner of machine 10. The machine has a sheet metal cabinet with removable panels, such as 12, 14, and FIG. 2 shows the machine with the panels removed so that drive motor 16 and clutch housing 18 are visible. Legs with adjustable casters 20 are situated at each corner of the machine so that the machine can be retained on an even keel even if there are irregularities in the floor that supports the machine.

A substantially rectangular table 22 extends horizontally across machine 10, and a U-shaped channel 24 is secured to table 22. Channel 24 is longer than the table and extends beyond the opposite ends of the table. An extension 25 is secured to channel 24 at one end thereof, and upstanding rib-like guides 26 are located at spaced intervals on opposite sides of channel 24 along its longitudinal extent. Longitudinally extending rails 28 extend between guides 26 to retain the bottles to be decapped in an upstanding orientation at all times.

A first support deck 30 is maintained a fixed distance above table 22 by braces 32, 34, and 36, and an elongated shaft 38 extends longitudinally through the braces. A manually adjustable control knob 40 is secured to one end of the shaft. A conventional mechanism (not shown) for horizontally shifting each brace is situated at each intersection of shaft 38 with a brace; such conventional mechanism may be a pawl and ratchet or a worm gear interaction. Each brace is joined to support deck 30 by an upstanding pin 42 which fits into a small slot 44 in the deck. A second identical support deck is located on the opposite side of channel 24; all that is visible of such second support deck in FIG. 2 is elongated shaft 46 and manually adjustable control knob 48. The operator for machine 10 manually alters the spacing between the first and second support decks in accordance with the diameter of the bottles to be decapped.

A pair of vertically oriented shafts 50, 52 extend upwardly above deck 30, and a series of pulleys 54 are secured to the shafts to be driven therewith. The lower ends of shafts 50, 52 are driven in a conventional fashion from drive motor 16 through the clutch in housing 18 and a power transmitting system including drive chain 56 which is positioned between table 22 and the underside of support deck 30. A series of flexible belts 58, 60 and 62 are individually entrained around pulleys 54, and an adjustable support device 64 is provided to vary the tension in the belts, when necessary. Three vertically extending idler rollers 65 are located between driven shafts 50 and 52.

The second support deck on the opposite side of channel 24 has a similar arrangement of vertically oriented shafts, idler rollers, pulleys, etc. However, while belts 58, 60 and 62 are smooth, positioning lugs 66 are situated at spaced intervals along metal articulated drive belts 68 and 70. The lugs are spaced apart a distance corresponding to the diameter of the bottle to be decapped. Consequently, lugs 66 retain the bottles in fixed position while belts 58, 60 and 62 keep the bottles in vertical alignment during the course of their advancement through decapping machine 10.

An endless conveyor belt 72, a fragment of which is visible in FIG. 2, extends along the length of channel 24, and is driven in a conventional fashion by drive motor 16. The upper run of conveyor 72 is supported by the flanges of the open upper end of channel 24, while the lower or return run of the conveyor is supported by the closed end of the channel.

A third support deck 74 is located above, and parallel to, the second support deck and extends over the entire width of conveyor 72 and partially over deck 30. Deck 74 is enclosed by a sheet metal cover 76 portions of which are removed in FIG. 2 for the sake of clarity. A first series of three shafts 78, 80 and 82 depend from deck 76, and a second series of shafts 84, 86, and 88 are aligned therewith. The means for driving shafts 78, 80 and 82, respectively, are indicated generally by reference numeral 89 and the impact roller subassembly is indicated generally by reference numeral 91. Deck 74 is vertically adjustable relative to the second support deck and first support deck 30 by altering the setting on control knob 90, which alters the height of support columns 92 in a fashion similar to that described previously above in connection with first support deck 30.

A gauge 94 is provided at the discharge end of conveyor 72 to measure the height of the bottles to be decapped; obviously, the height of the columns will be adjusted in dependence upon the information gleaned by gauge 94. If desired, a similar gauge could be employed to measure the diameter of the bottles before altering the setting of control knobs 40 and 48.

Figure 3:
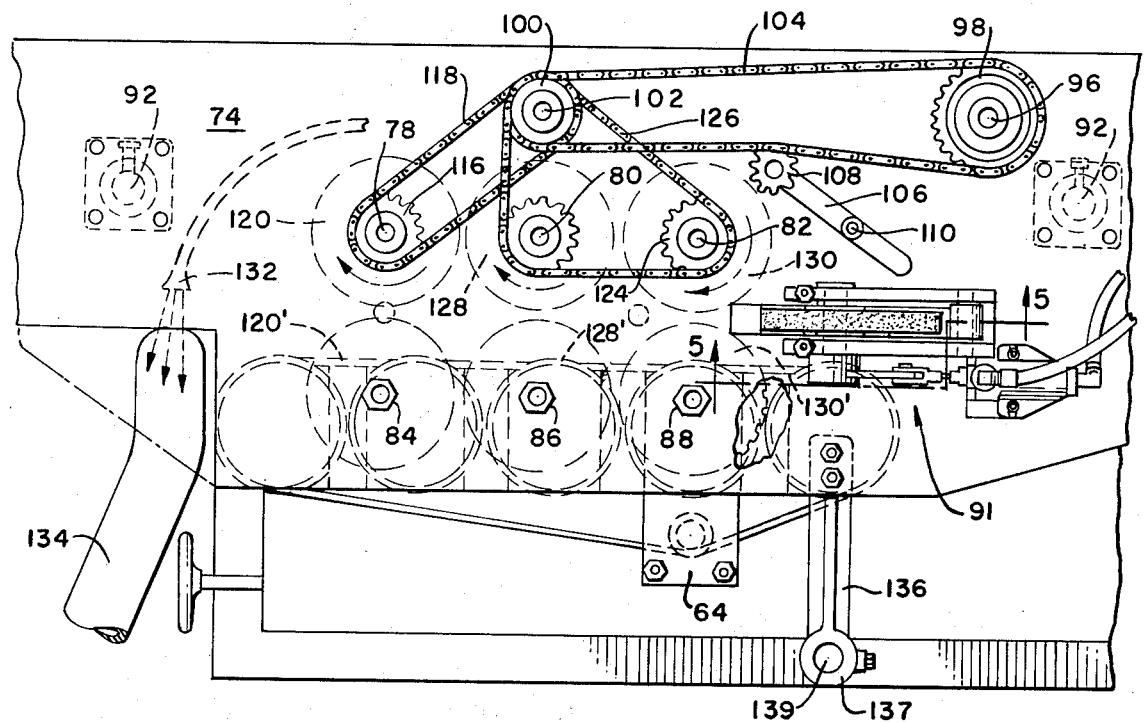
FIG. 3 is a top plan view of the impact roller, drive means therefor, and the series on relatively rotatable rollers employed of the decapping machine.
Figure 4:
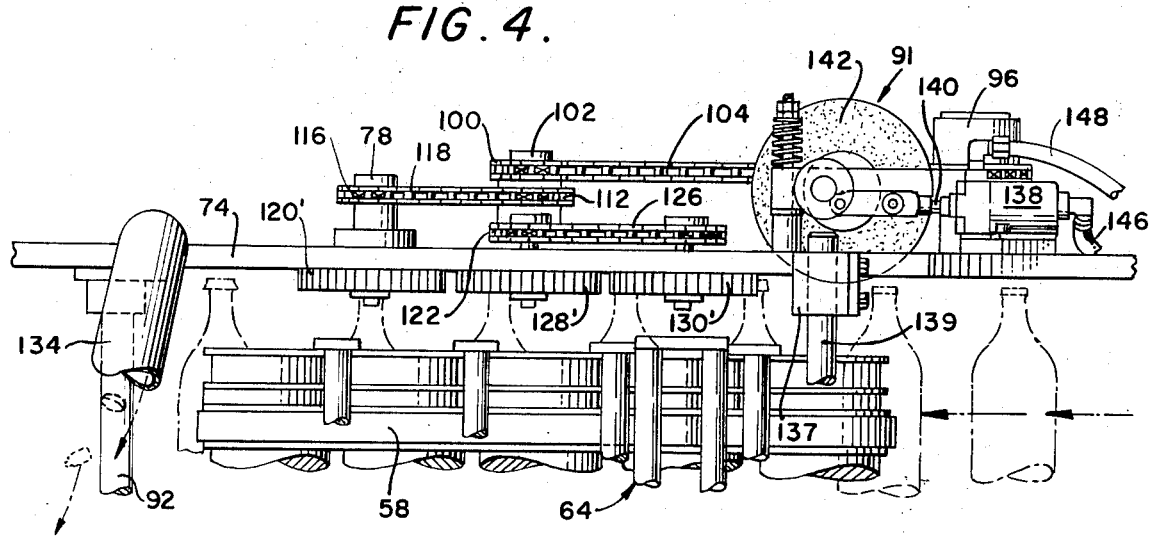
FIG. 4 is a side elevational view of the components of FIG. 3, with portions broken away for the sake of clarity.

The details of the means for driving shafts 78, 80 and 82, as well as many other details of the components operatively associated with deck 74, are shown in FIGS. 3 and 4. A vertically extending spindle 96 is driven from motor 16 when the clutch in housing 18 is engaged, and a sprocket wheel 98 is secured to spindle 96. A second sprocket wheel 100 is secured to shaft 102, and is spaced a distance from spindle 96. Articulated drive belt 104 is entrained over sprockets 98 and 100, and can transmit power from spindle 96 to rotate shaft 102. A lever 106 with a sprocket wheel 108 is secured to shaft 110 for pivotal movement thereabout. Sprocket wheel 108, when pivoted into engagement with belt 104, keeps belt 104 sufficiently taut to transmit power from spindle 96 to driven shaft 102. When lever 106 moves sprocket wheel 108 out of engagement with the belt, power is no longer transmitted from motor 16.

Shaft 102 has a trio of sprocket wheels spaced thereon; only the upper two sprocket wheels 100 and 112 are visible in the drawings. The function of wheel 100 has been described above, and sprocket wheel 112 and its hidden counterpart are driven in unison therewith. A sprocket wheel 116 is secured to shaft 78 at a location above deck 74, and an articulated drive chain 118 is entrained over sprocket wheels 112 and 116. A sturdy rubber roller 120, indicated by dotted lines in FIG. 3 but visible in FIG. 4, is secured to the lower end of shaft 78 at a point below deck 74. Consequently, when shaft 102 is driven from spindle 96, roller 120 is rotated at the same speed as the spindle.

A sprocket wheel 122 is secured to shaft 80, and yet another sprocket wheel 124 is secured to shaft 82 above deck 74. An articulated drive chain 126 is entrained about the third hidden sprocket wheel on shaft 102, sprocket wheel 122 on shaft 80, and sprocket wheel 124 on shaft 82. A second sturdy rubber roller 128 is secured to the lower end of shaft 80 at a point below deck 74, and a third roller 130 is similarly secured to shaft 82. Drive chain 126 rotates rollers 128 and 130 in the same direction and at the same speed as the first rubber roller 120.

Shafts 84, 86 and 88 on the overhanging portion of deck 74 are aligned with shafts 78, 80, and 82, as shown in FIG. 3. A sturdy rubber roller 120' is secured to the lower end of shaft 84, and identical rollers 128' and 130' are secured to the lower ends of shafts 86 and 88, respectively. Rollers 120', 128' and 130' are aligned with, and identical in shape to, rollers 120, 128 and 130. Since the shafts supporting rollers 120', 128' and 130' are merely suspended and not driven from a source of power while rollers 120, 128 and 130 are driven by appropriate drive belts and sprocket wheels, relative angular motion is created between the members of each pair of cooperating rollers. The rollers are spaced apart by a distance substantially equal to the diameter of the cap, so that the relative angular motion can be utilized to spin the loosened caps off the bottles after the impact roller subassembly has been actuated to break the seal between the cap and the bottle. The loosened caps are blown by an air jet issuing from tube 132 into chute 134 which deposits the caps into an appropriate collection receptacle (not shown).

As previously noted, support columns 92 can be adjusted to alter the height of deck 74 relative to first support deck 30 and the second support deck on the opposite side of conveyor 72. The overhang of deck 74, which extends laterally beyond the bottles, is additionally supported by a beam 136 having a collar 137 at its free end; the collar fits over vertically extending post 139 and is vertically adjustable therealong as the deck is raised and lowered. The overhang of deck 74 also extends over driven shafts 50, 52 and idler rollers 65 positioned therebetween, and partially over adjustable support device 64. Impact roller subassembly 91 is situated near the upstream end of deck 74.

FIGS. 4–7 depict the details of impact roller subassembly 91 which includes an air cylinder 138 with an extensible piston rod 140, and a resilient impact roller 142 secured upon shaft 144. The cylinder is actuated by fluid under pressure supplied over conduit 146, and the cylinder is vented to the atmosphere over discharge conduit 148. Piston rod 140 has a clevis 150 at one end, and a link 152 is secured to the clevis by a stub shaft 154 having a cotter pin 156 fastened thereto. Link 152, in turn, is pinned to annular plate 158 which is secured upon shaft 144.

The arms of yoke 160 extend along opposite sides of the vertically oriented impact roller 142, and shaft 144 passes through the yoke. The yoke is maintained above deck 74 by pin 162 which passes through pedestal 164. Channels 166, 167 are drilled vertically through the free end arms of yoke 160, and bolts 168, 170 pass freely therethrough. The lower ends of the bolts are secured to support shafts 172, and coil springs 174 are slipped onto the bolts above the arms of yoke 160. Nuts 176 are screwed onto the upper end of the bolts to compress springs 174 and thus bias the yoke downwardly.

Shaft 144 may be an eccentric shaft so that the effectiveness of roller 142 in delivering a sharp blow to the caps on the bottles passing therebelow is enhanced. Also, roller 142 need not be circular, but may be arcuate in shape without any diminution in its effectiveness. Springs 174 function as shock-absorbers and enhance the effectiveness and service life of roller 142. When necessary, shaft 144 may be disengaged and a worn roller 142 replaced thereupon with minimal effort and expense.

CYCLE OF OPERATION

Although the cycle of operation of decapping machine 10 should be readily apparent from the detailed description of the drawings set forth above, the highlights of the cycle of operation are briefly set forth hereinafter to focus attention upon the significant aspects of the instant invention. The bottles to be decapped are stacked in single file upon extension 25 of machine 10, and the machine settings are adjusted to accommodate bottles of a particular size by changing the settings on control knobs 40, 48 and 90. After the drive motor 16 for advancing conveyor belt 72 has been turned on, the bottles are individually fed onto the belt 72. One face of each bottle is engaged by lugs 66 on drive belts 68, 70 and the opposite face is contacted by flexible belts 58, 60, and 62. These horizontally extending belts keep the bottle in an upright position during the course of its travel.

Figure 5:
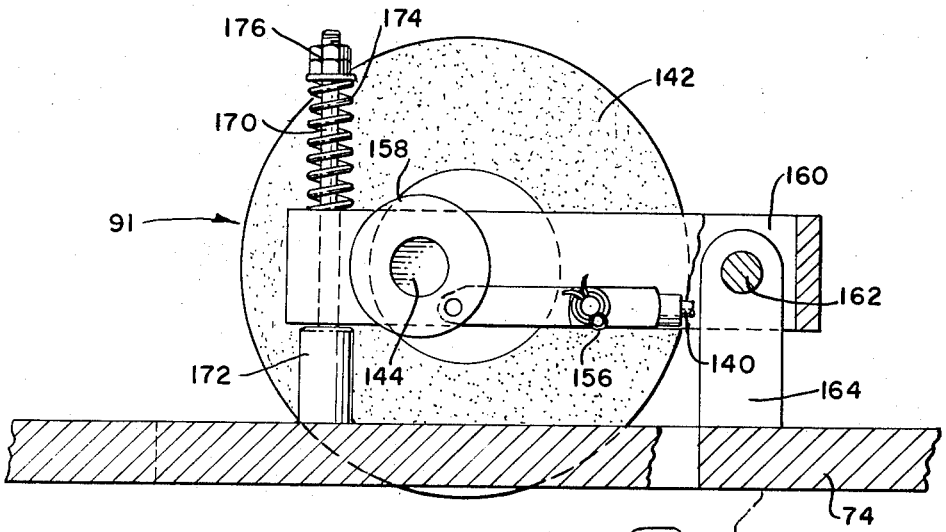
FIG. 5 is an enlarged side elevational view of the impact roller in its unactuated position, such view being taken along line 5—5 in FIG. 3 and in the direction indicated.
Figure 6:
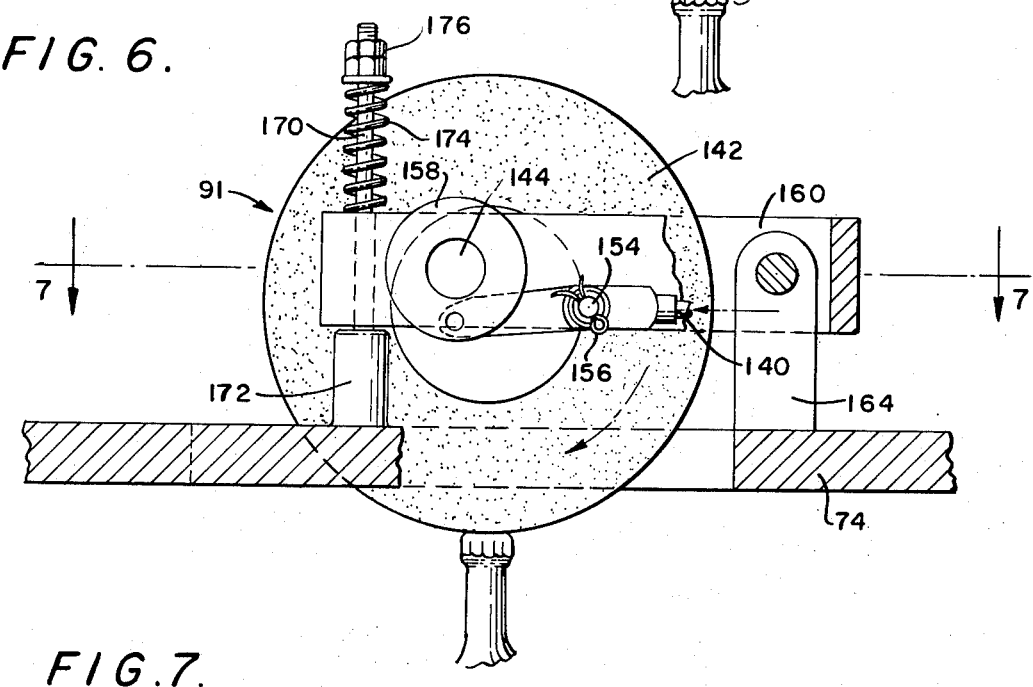
FIG. 6 is an enlarged side elevational view of the impact roller in its actuated condition as it strikes a cap on a bottle.
Figure 7:
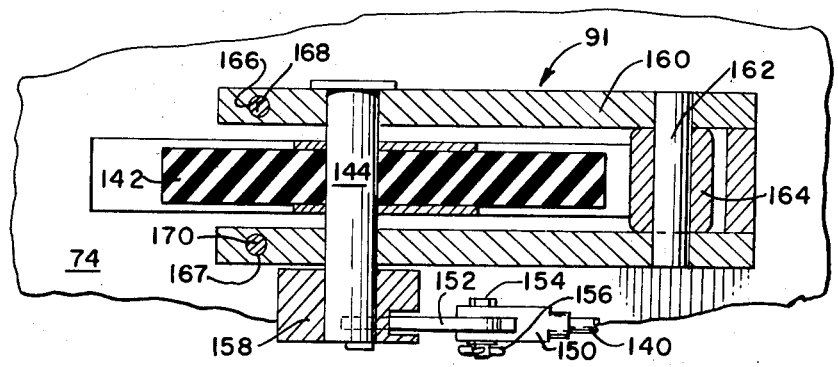
FIG. 7 is a horizontal cross-sectional view through the impact roller, such view being taken along line 7—7 in FIG. 6 and in the direction indicated.

As conveyor belt 72 advances the bottle, air cylinder 138 is energized and vertically oriented impact roller 142 is oscillated downwardly under control of a linkage joined to the air cylinder, as shown in FIGS. 5 and 6, to deliver a sharp blow to the cap seated upon the bottle. The bottle, with the loosened cap seated thereupon is moved downstream by conveyor belt 72 into operative association with three pairs of relatively rotatable rollers 130, 130', 128, 128' and 120, 120', respectively. The relative rotation of the rollers, which are spaced on opposite sides of the path of travel of the bottles and at an elevation corresponding to the height of the neck of the bottles, spins the caps upwardly and off the bottle. An air jet issuing from tube 132 blows the cap into a chute 134, which discharges the cap into a collection receptacle. The pneumatic circuitry (not shown) for controlling the operation of air cylinder 138 is correlated with the speed of conveyor so that impact roller 142 is oscillated downwardly at the exact moment that the bottle is passing therebelow, and is oscillated upwardly immediately after delivering its sharp blow. The resilient nature of roller 142 prevents the breakage of the bottles being struck, while the absorbing springs 174 increases the service life of the roller by damping out out undesirable reactive forces. If a resealable cap has not been replaced on the bottle, the roller will oscillate by, or merely brush, the upper end of the bottle. Also, although the roller has been shown in a vertical orientation perpendicular to the path of movement of the bottles, the impact roller could deliver a sharp blow over a wide range of angular orientations.

Obviously, numerous variations or modifications in the above noted apparatus will occur to the artisan skilled in the bottling art after reviewing the specification and drawings. Hence, it is believed that the appended claims defining the invention should be construed liberally in harmony with the spirit and scope of the instant invention.

I claim:
1. A decapping machine for removing caps from bottles comprising:
    a. a rigid supporting framework,
    b. conveyor means mounted on said framework for transporting capped bottles therealong,
    c. guide means for retaining the bottles in an upright orientation while being transported on said conveyor means, d. relatively rotatable roller means secured to said framework at spaced intervals for imparting a spinning motion to the caps on the bottles as the bottles are transported thereby, the improvement comprising:

e. impact means secured to the framework at a location upstream of said roller means for delivering a sharp blow to the caps on the bottles to thereby break any seal formed therebetween.

2. The decapping machine as defined in claim 1 wherein the impact means includes a vertically-oriented resilient roller mounted upon a horizontally extending shaft.

3. The decapping machine as defined in claim 2 wherein said shaft is eccentrically shaped.

4. The decapping machine as defined in claim 3 wherein the impact means further includes shock absorbing means for damping out undesirable vibrations caused by the roller striking the caps on the bottles.

5. The decapping machine as defined in claim 4 wherein the impact means includes a U-shaped yoke secured by a horizontally extending pin to a pedestal on the framework for pivotal motion, said yoke having vertical channels passing through the free ends of the arms of the yoke, threaded bolts passing upwardly through said channels, and said shock absorbing means comprises spring means positioned on said bolts to bias said yoke downwardly.

6. The decapping machine as defined in claim 1 wherein the impact means delivers its sharp blow in response to the actuation of an air cylinder which energizes an extensible piston.

7. The decapping machine as defined in claim 6 wherein said extensible piston rod is secured to a linkage, which, in turn, is secured to an annular plate, said plate being mounted upon one end of the shaft, which supports said impact means, whereby the extension and retraction of said piston rod governs the movement of said impact means.

* * * * *